(12) United States Patent
Park et al.

(10) Patent No.: US 11,755,839 B2
(45) Date of Patent: Sep. 12, 2023

(54) LOW RESOURCE NAMED ENTITY RECOGNITION FOR SENSITIVE PERSONAL INFORMATION

(71) Applicant: International Business Machines Corporation, Armonk, NY (US)

(72) Inventors: Youngja Park, Princeton, NJ (US); Jatin Arora, Urbana, IL (US)

(73) Assignee: International Business Machines Corporation, Armonk, NY (US)

(*) Notice: Subject to any disclaimer, the term of this patent is extended or adjusted under 35 U.S.C. 154(b) by 356 days.

(21) Appl. No.: 17/324,212

(22) Filed: May 19, 2021

(65) Prior Publication Data
US 2022/0374602 A1    Nov. 24, 2022

(51) Int. Cl.
| | | |
|---|---|---|
| G06F 17/00 | (2019.01) | |
| G06F 40/295 | (2020.01) | |
| G06F 40/284 | (2020.01) | |
| G06N 20/00 | (2019.01) | |
| G06F 40/166 | (2020.01) | |
| G06F 40/30 | (2020.01) | |

(52) U.S. Cl.
CPC .......... *G06F 40/295* (2020.01); *G06F 40/166* (2020.01); *G06F 40/284* (2020.01); *G06F 40/30* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 8,874,432 B2* | 10/2014 | Qi | G06F 16/3344 |
| | | | 704/9 |
| 10,878,184 B1 | 12/2020 | Estes et al. | |
| 2019/0378049 A1 | 12/2019 | Widmann et al. | |

(Continued)

OTHER PUBLICATIONS

Anonymous, "Entity based Shallow NLP Q&A with Ontological matching and user correction", IP.com Prior Art Database, IP.com No. IPCOM000260221D, Nov. 5, 2019, 4 pages.

(Continued)

*Primary Examiner* — Satwant K Singh
(74) *Attorney, Agent, or Firm* — Stephen J. Walder, Jr.; Jeffrey S. LaBaw

(57) ABSTRACT

Natural language processing (NLP) methodologies and mechanisms are provided that include a named entity recognition (NER) computer model augmented to operate on an entity pattern embedding input feature in addition to other embedding input features. The mechanisms tokenize natural language content (NLC) to generate tokens and process a selected token in accordance with a predetermined entity pattern embedding technique to generate an entity pattern embedding input feature for the selected token. The entity pattern embedding input feature specifies a pattern of characters present in the selected token. The mechanisms process the NLC to generate the other embedding input features in accordance with other embedding techniques, and process, by the NER computer model, the other embedding input features and the entity pattern embedding input feature for the selected token to generate a predicted tag for the selected token. The predicted tag specifies a named entity type classification for the selected token.

20 Claims, 4 Drawing Sheets

(56) References Cited

U.S. PATENT DOCUMENTS

| | | | |
|---|---|---|---|
| 2021/0042344 A1 | 2/2021 | Hu et al. | |
| 2021/0081411 A1* | 3/2021 | Begun | G06F 16/2457 |
| 2021/0081601 A1* | 3/2021 | Begun | G06F 40/289 |
| 2021/0081602 A1* | 3/2021 | Begun | G06F 40/169 |
| 2021/0081608 A1* | 3/2021 | Begun | G06F 40/186 |
| 2021/0081613 A1* | 3/2021 | Begun | G06N 20/00 |
| 2021/0117617 A1* | 4/2021 | Blaya | G06F 40/253 |
| 2022/0115100 A1* | 4/2022 | Barve | G16H 10/20 |
| 2022/0171931 A1* | 6/2022 | Fusco | G06N 20/00 |
| 2022/0277141 A1* | 9/2022 | Nijkamp | G06F 40/295 |

OTHER PUBLICATIONS

Anonymous, "Entity Reasoning Using a Corpus-Specific Gazetteer Derived from Unstructured Data", IP.com Prior Art Database, IP.com No. IPCOM000262486D, Jun. 4, 2020, 5 pages.

Anonymous, "Method and system for detecting entity specific documents", IP.com Prior Art Database, IP.com No. IPCOM000262161D, May 7, 2020, 5 pages.

Nedellec, Claire et al., "Annotation Guidelines for Machine Learning-Based Named Entity Recognition in Microbiology", Proceeding of Data and Text Mining for Integrative Biology Workshop 17. European Conference on Machine Learning 10. European Conference on Principles and Practice of Knowledge Discovery in Databases, ffhal-02750827f, Sep. 2006, 15 pages.

Neumann, Gunter et al., "Lecture 3.1: Machine Learning for Named Entity Recognition", Esslli Summer School, Intelligent Information Extraction, 2004, 62 pages.

Pappu, Aasish et al., "Method and System for Recognizing and Linking Named Entities in documents", IP.com Prior Art Database, IP.com No. IPCOM000254671D, Jul. 20, 2018, 5 pages.

Seon, Choong-Nyoung et al., "Named Entity Recognition using Machine Learning Methods and Pattern-Selection Rules", Proceedings of the Sixth Natural Language Processing Pacific Rim Symposium, Nov. 27-30, 2001, 8 pages.

* cited by examiner

LOW RESOURCE NAMED ENTITY RECOGNITION FOR SENSITIVE PERSONAL INFORMATION

BACKGROUND

The present application relates generally to an improved data processing apparatus and method and more specifically to mechanisms for enabling low resource named entity recognition with regard to sensitive personal information.

Automated tools have been developed to help with understanding unstructured, or natural language, text data in electronic documents. These automated tools rely on named entity recognition (NER) to parse and categorize entities found in portions of text into predetermined categories such as person names, organizations, locations, quantities, monetary values, time expressions, etc. NER allows for processing of the text and tagging the entities identified in the text with the corresponding category tags so that more efficient searching and processing of the text can be performed by other downstream computing systems. For example, if one were to perform a search of a database of documents, rather than searching each and every word of each and every document, which can be very time consuming and processing resource intensive, searching a relatively smaller set of tagged entities can make the search faster and more efficient.

NER systems have been created that use linguistic grammar-based techniques, as well as machine learning computer models including both statistical and deep learning methods, to classify portions of text into predetermined named entity categories, such as those described above. However, in order to train such machine learning computer models to perform such named entity recognition tasks, a large amount of manually labeled training data, i.e., portions of text with the correct tags or labels for the various entities manually specified, is required for every type of named entity sought to be recognized. As a result, such training data comprises only a relatively small set of standard lexical entities, such as person names, organization names, and locations, resulting in automated tools that have limited or no ability to perform named entity recognition with regard to seldom encountered entities in portions of text. That is, while the machine learning trains the computer models to recognize the standard lexical entities, they are unable to identify seldom encountered entities with any appreciable accuracy, as they are not trained to identify such seldom encountered entities due to lack of labeled training data.

Moreover, the trained machine learning computer models tend to be overfit to the training data and do not generalize well to textual content that is not adequately represented in the training data. That is, the machine learning training trains the machine learning computer models well to identify the instances of the particular names (e.g., "John", "Steve", etc.), locations (e.g., "Texas", "Dallas", etc.), and other standard lexical entities actually present in the training data, but the trained machine learning computer model does not do as well in identifying instances of these standard lexical entities that were not represented in the training data (e.g., "Purcell", Oklahoma).

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a natural language processing (NLP) computing system comprising a named entity recognition (NER) computer model augmented to operate on an entity pattern embedding input feature in addition to one or more other input features. The method comprises tokenizing natural language content to generate one or more tokens, wherein each token represents a subset of text in the natural language content, and processing a selected token, in the one or more tokens, in accordance with a predetermined entity pattern embedding technique to generate an entity pattern embedding input feature for the selected token. The entity pattern embedding input feature specifies a pattern of characters present in the selected token. The method further comprises processing the natural language content to generate the one or more other embedding input features in accordance with one or more other embedding techniques, and processing, by the NER computer model, the one or more other embedding input features and the entity pattern embedding input feature for the selected token to generate a predicted tag for the selected token. The predicted tag specifies a named entity type classification for the selected token. Moreover, the method comprises performing, by the NLP computing system, an NLP operation based on the predicted tag.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
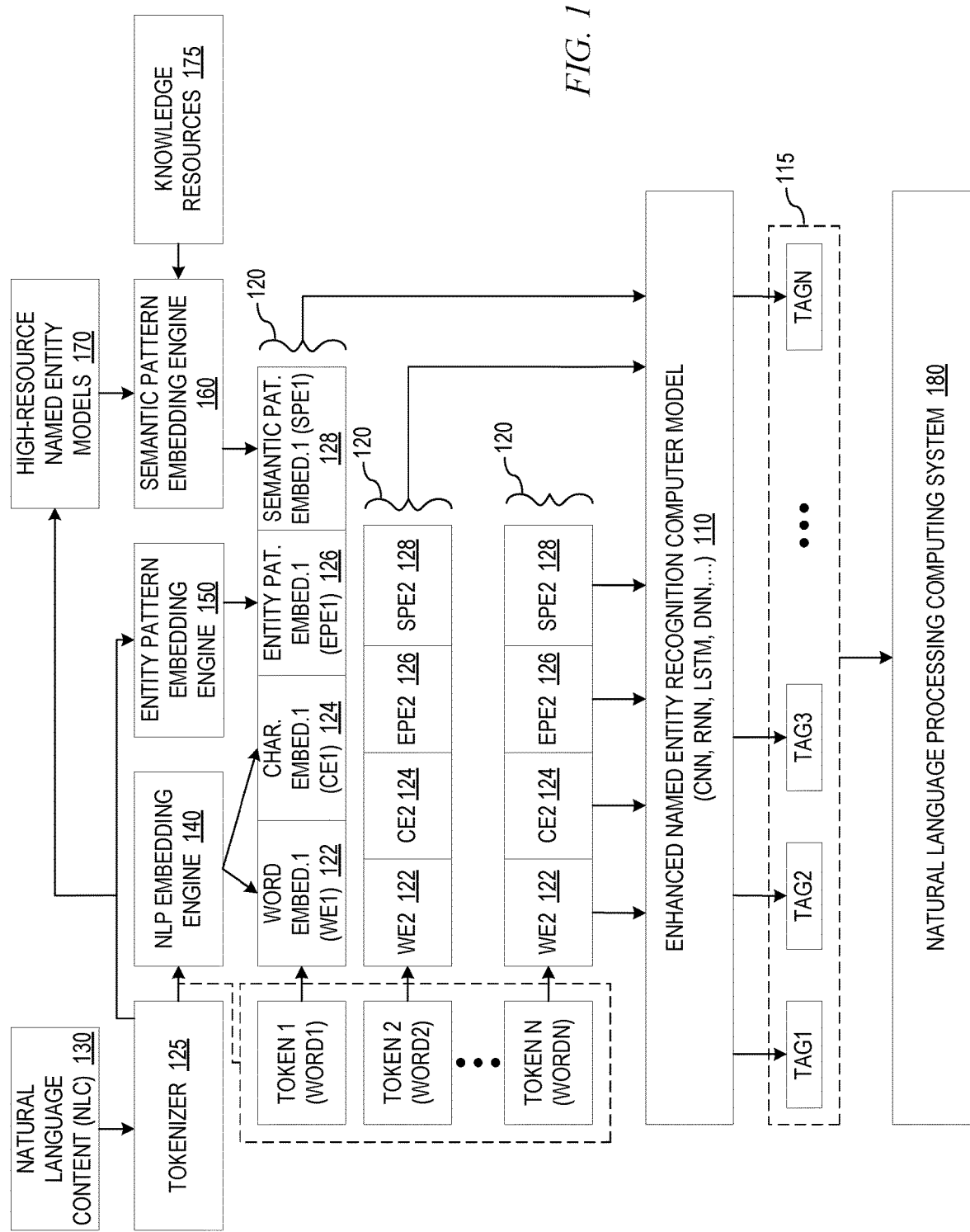
FIG. 1 is an example block diagram illustrating an operation of an improved named entity recognition (NER) computing tool in accordance with one illustrative embodiment.

The illustrative embodiments provide an improved computer tool to enhance the accuracy of Named Entity Recognition (NER) in natural language processing (NLP) computing systems, especially for entities with insufficient annotated data to perform machine learning training of NER computer models. The accuracy of NER is improved by the mechanisms of the illustrative embodiments with regard to precision, i.e., the fraction of correct positives among the total predicted positives (correctly classified entities), or the accuracy of positive predictions, and recall, i.e., the correct positives (correctly classified entities) among the total positives in the dataset and indicates the total positives of the actual dataset that were classified correctly while performing an operation. As a result, the improved computer tool mechanism of the illustrative embodiments improve the way in which NER operations in NLP computing systems is performed, especially with regard to named entities that have seldom occurrences in natural language content, and which, as a result, are not sufficiently represented in machine learning training datasets.

The lack of annotated data for entities in training data may occur with a variety of different entities, but is especially prevalent in the case of sensitive personal information, or personally identifiable information, i.e. information that either by itself, or in combination with other information, may uniquely identify a particular individual. That is, in applications where natural language processing is to be performed on natural language content that may include sensitive personal information, such as personal medical records, medical trial information, various government documents, or the like, there is insufficient training data, due to the sensitive nature of the sensitive personal information, to train the NER computer models to identify the entities specified in the portions of the natural language content that comprise sensitive personal information. It should be appreciated that while the following illustrative embodiments will be described with regard to identifying entities present in sensitive personal information, the illustrative embodiments are not limited to such and may be applied to any entities having insufficient instances in training data to adequately train NER computer models to accurately identify those entities in natural language content.

Named entity recognition (NER) is a widely studied field in natural language processing NLP community and aims to automatically identify mentions, or instances, of certain standard entity types, such as person names and locations, in unstructured, or natural language, text. For example, from the sentence "John Smith, a resident of 501 W Green St., Cambridge, Mass.—60801, has paid $100.0 of taxes in July '20. His social security no. identifiable as, 992-2122-1234, should be . . . ", an NER based NLP computer system tries to extract Person (John Smith), Address (501 W Green St., Cambridge, Mass.—60801), Money ($100.0) and SSN (992-2122-1234). These NER tools have been used for applications such as information retrieval, knowledge graph construction and event detection. Existing NER methods can be categorized into three different types: (1) machine learning-based methods using a large number of labeled examples for training; (2) dictionary and regex rule match-based methods; and (3) a combination of (1) and (2).

Recent NER mechanisms apply deep learning techniques, such as convolutional neural networks (CNNs) and Long Short-Term Memory (LSTM) based recurrent neural network (RNN) architectures, and rely on the semantic (e.g., word embedding) and syntactic (e.g., Part of Speech (POS) tag) information of the candidate tokens (e.g., smaller units of text, such as words, characters, sub words, etc.) and their surrounding context words to determine the entity types of the entities identified in the natural language content, or unstructured text. Some NER tools utilize external knowledge, such as a knowledge graph, a gazetteer or on-line encyclopedia articles, or the like to obtain additional information that can aid in recognizing named entities in the natural language content.

These approaches have shown their effectiveness for general entity types such as geological locations, commercial products, or well-known people and events. However, for many sensitive personal information types (e.g., driver's license number, membership identifier, etc.) and domain specific entity types (e.g., biomedical or cybersecurity entities), there is little if any training data or external knowledge resources, precisely because of their sensitive nature. Furthermore, existing NLP tools for syntactic and semantic analysis are trained with general domain data and therefore, the state-of-the-art NER methods do not perform well for low resource named entities, e.g., sensitive personal information, or personally identifiable (PII), entity types and domain-specific entity types, for which there is less than a predetermined number of labeled instances of these entity types in the training data used to train the machine learning models, where the predetermined number of labeled instances is set based on a desired implementation and indicates a minimum number of labeled instances to achieve convergence of the training of the machine learning model. In addition, existing NER methods learn the semantic information of tokens at the word level or character level. In this way, the possible vocabulary size grows very large requiring large training data to produce reliable representations.

The terms "low" resource named entities and "high" resource named entities will be used in the present description. The term "low" refers to those types of named entities for which there is insufficient number of instances to train a machine learning computer model, e.g., a NER computer model of a NLP computer system, to obtain a predetermined level of accuracy in identifying those types of named entities, whereas the term "high" refers to those types of named entities for which there are sufficient number of instances to train the NER computer model to obtain the predetermined level of accuracy in identifying those types of named entities. The number of instances needed to be "sufficient" will be implementation specific and may vary from one implementation to another. The dividing line between sufficient number of instances and insufficient number of instances depends on several factors including, but not limited to, the type (complexity) of the machine learning model being trained, e.g., statistical machine learning (ML) models such as logistic regression, naïve bayes, SVM, and the like, are simpler than deep learning models and thus, the threshold for sufficiency is lower for statistical ML models than for other more complex models, e.g., 50 instances instead of 100 instances for a deep learning ML model. Moreover, the dividing line may be dependent on the number of parameters the model needs to train, where more layers of a neural network and more complex architectures will need more instances to adequately train, compared to relatively simpler neural network models.

Another factor that may affect the number of instances of an entity type required to provide a sufficient training of the ML model may be the relative ratio between high resource type named entities and low resource type named entities. If the training data contains more than one type to learn, i.e., not a binary class but a multi-class problem, the relative numbers of the classes also affect the determination of a sufficient number of instances for a named entity to be considered a "low" or "high" resource named entity. For example, if a model is built to recognize a person and telephone number, the model performs differently when the training dataset contains 100 persons and 10 telephone numbers versus 1000 persons and 10 telephone numbers. Even though the telephone number has 10 instances in both cases, the model is dominated by the person entity more in the second case so that accuracy is likely worse in the second case than in the first. Moreover, the diversity of classes, or labels, represented in the training dataset will also affect the accuracy of the named entity recognition, e.g., it may be better to have a smaller number of instances but all different instances than a larger number of instances with many duplicates, e.g., having 10 different person entity instances is better than have 20 "John Smith" instances.

The dividing line between "low" and "high" may be set to any desirable number of instances based on a subject matter expert's own expertise. In one illustrative embodiment, this dividing line may be set to "100" meaning that named entities that have less than 100 instances represented in the training data are considered "low" resource named entities, while entities that have 100 or more instances may be considered "high" resource named entities. In other illustrative embodiments, this dividing line, or threshold, may be set to any other value, e.g., "500" for example, depending on the factors discussed above.

As noted previously, there is a major limitation in applying existing NER techniques for data privacy and security applications, e.g., performing NER techniques in the natural language processing of natural language content having sensitive personal information. Firstly, the state of the art techniques require a large amount of manually labeled (annotated) training data or manually constructed dictionaries, which are not available for sensitive personal information, also referred to herein as personally identifiable information, or PII. This limitation is referred to as a data bottleneck. Subsequently, due to the data bottleneck, existing NER tools focus on general entity types and not entity types of a PII nature.

The illustrative embodiments provide mechanisms to overcome the data bottleneck problem and identify various PII entity types by automatically learning both intrinsic and extrinsic properties of the PII entities. It should be appreciated that while the description of the illustrative embodiments hereafter will reference PII entity types, the illustrative embodiments may operate with regard to any entity types which are significantly underrepresented in the training of NER computer model based NLP computer systems. Thus, these entity types, which have little if any instances in the training data used to train the NER computer models via a machine learning process, will be referred to herein as "low-resource named entities."

With the mechanisms of the illustrative embodiments, an improved computing tool is provided that overcomes these problems by providing mechanisms for automatic learning of entity pattern embeddings which are learned for entity mentions (or instances), in addition to word-level and character-level representations, and mechanisms that incorporate, as external knowledge, semantic information provided inherently in the entity types, without assuming any further external knowledge. As a result, the mechanisms of the illustrative embodiments do not rely on scarce and expensive resources, such as annotated training data having sufficient instances of sensitive PII entities, or external knowledge resources that have information regarding sensitive PII entities, and can be applied to many real world applications.

It should be appreciated that while the entity pattern embeddings are especially useful in the mechanisms of the illustrative embodiments with regard to low resource named entities, the entity pattern embeddings may be used with any or all of the entities present in natural language content, even those considered to be standard and well represented in the training datasets. With regard to the entity pattern learning for performing the entity pattern embedding, the mechanisms of the illustrative embodiments learn the intrinsic lexicographical patterns of entity mentions (or instances) in addition to word embedding and character-sequence embedding. The entity pattern embedding mechanisms of the illustrative embodiments operate based on the observation that many entities are often expressed in a relatively small number of different known patterns. For example, United States of America (US) telephone numbers are typically written as "3 digits with or without parentheses, a hyphen or a space, 3 digits, a hyphen or a space and followed by 4 digits", which can be represented as a pattern, (D3)-D3-D4, or (DDD)-DDD-DDDD, where "D" refers to "digit". Similarly, a US driver's license number, e.g., F225-9292-1234 or M412-6337-9876, can be represented as U1D3-D4-D4, where "U" refers to an uppercase character. Similar intrinsic patterns can be learned from many domain-specific entities such as Protein Molecule (NF-Kappa B) and Protein Mutation (Asp506Gly).

The entity pattern embedding mechanisms of the illustrative embodiments automatically learn a higher-level representation of entity mentions (or instances) than word or character-level representation. By learning these intrinsic patterns of the entities in addition to word representations, the NER computer model can generalize better to unseen mentions, e.g., entity types corresponding to low-resource named entities, such as PII entities, and can enhance the NER computer model's accuracy when there are not many examples of those entities provided for the machine learning training of the NER computer model(s). That is, the enhanced or improved NER computer model is a modified NER computer model that is modified to receive, in addition to the other features upon which the NER computer model operates, the entity pattern embeddings for entities in the natural language content. The improved NER computer model uses this additional entity pattern embedding along with the other features to recognize the entities even when the entities are not standard entity types, i.e., high-resource entity types for which there is sufficient representation in the training dataset(s). Thus, where the word embeddings and character embeddings would be insufficient to identify the low-resource named entity mention or instance, the entity pattern embedding provides sufficient additional knowledge to be able to accurately identify the low-resource named entity. This improves the accuracy of the improved NER computer model and thus, improves the NLP computing system operations that utilize these NER computer models to perform entity recognition so that the natural language processing operations can be performed correctly.

As noted above, if there are not enough training samples in the training datasets for a particular named entity, incorporating external knowledge from external knowledge sources, such as dictionaries, knowledge graphs, or the like, can be beneficial to the named entity recognition. However, external knowledge often does not exist for many domains or is very expensive to obtain since it often requires significant manual effort to construct such external knowledge sources. The illustrative embodiments may utilize semantic information in the entity type, or category, name itself as external knowledge. For example, an entity type (e.g., PERSON) provides semantic information about the entity being a person (entity types or entity type classifications are differentiated herein from the entities themselves or textual words by all-capitalizing the entity types). Well trained word embeddings put the word "person" close to actual person names such as "Mary" and "John". Further, as discussed hereafter, the mechanisms of the illustrative embodiments can automatically learn that person names often appear in the close proximity with entity types of ADDRESS and/or TELEPHONE NUMBER. Thus, the entity types of the named entities identified in the input may be used to identify a context pattern, e.g., PERSON, ADDRESS, and TELEPHONE NUMBER.

The semantic information from the entity type and context patterns may be incorporated into the NER computer model in two ways. Firstly, the inter-dependencies between a target class and each word are captured by capturing their semantic relatedness. Semantic dependencies are determined based on the embeddings of the target classes and input tokens. The entity type, or classification, embeddings are obtained from the word embeddings of the entity type, or class, names. For example, the mechanisms of the illustrative embodiments may use the embedding for the word "person" as the embedding for the class PERSON (or PER), and embeddings of the words "driver", "license", and "number" as the embedding for the class DRIVER's LICENSE NUMBER. Note that the illustrative embodiments do not depend on any other external sources for determining the embedding of the semantic information as additional knowledge resources.

Secondly, the semantic information from the entity type and context patterns may also be incorporated into the NER computer model by observing that certain entity types, or classes, often appear together. For instance, a TELEPHONE NUMBER often appears in vicinity of PERSON and LOCATION. The mechanisms of the illustrative embodiments use knowledge guidance from known entities to better detect low resource named entity mentions. That is, there are many high-performing NER tools available for high-resource named entity types (i.e., PERSON, LOCATION, etc.). These already configured NER tools for high-resource named entity types may be used to pre-label high resource named entities in the natural language content, and use the pre-labeled entity types, or classes, as additional input to define context patterns that may be added as additional input information for the improved NER and NLP computing tools of the illustrative embodiments to use in performing NER operations for low-resource entity types.

Thus, the illustrative embodiments provide mechanisms for improving named entity recognition, especially in situations where the named entities are seldom encountered in natural language content and/or are significantly under-represented in training datasets, i.e., are low-resource named entities, due to their sensitive nature or simply the large expense and amount of time required to create annotated training data for these named entities. This is especially the case with regard to sensitive personal information, such as personally identifiable information (PII), which is specifically not represented in training datasets due to its sensitive nature. As known models learn from individual samples in the training datasets, if there are an insufficient number of instances of individual samples for a named entity, then the resulting model will not be able to accurately identify such named entities. For example, one does not train a NER computer model with a large training dataset comprising a large number of individuals' personal social security numbers, driver's license numbers, telephone numbers, passport numbers, email addresses, IP addresses, MAC addresses, and financial information such as bank account numbers, credit card numbers and tax id number, etc. The same is true for domain specific information, such as protein molecule and protein mutation codes or the like, due to the large amount of human effort needed to generate the annotated training datasets.

The illustrative embodiments provide an improved computing tool having an improved NER computer model that utilizes pattern encodings and context encodings as additional information to the word and/or character embeddings, to perform NER operations on low resource named entities and thereby improve the accuracy of the NER computer model and the NLP computer systems employing the improved NER computer model.

Before continuing the discussion of the various aspects of the illustrative embodiments and the improved computer operations performed by the illustrative embodiments, it should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

FIG. 1 is an example block diagram illustrating an operation of an improved named entity recognition (NER) computing tool in accordance with one illustrative embodiment. The operation of FIG. 1 may be employed during training of an improved NER computing model of the illustrative embodiments and during runtime operation after the improved NER computing model has been trained. The primary difference between the training operation and the runtime operation is the modification of NER computing model operational parameters based on a determined error or loss. That is, as part of the machine learning training of the NER computing model, the NER computing model generates predictions of annotations (also referred to as labels or tags) for a particular entity mention (e.g., a word referencing an entity) based on a processing of features extracted from the natural language content, or unstructured text. This prediction is compared to a known correct annotation and if there is an error in this prediction, then the operational parameters associated with the portions of the NER computing model that contributed to, or contributed the most to, the prediction are adjusted to attempt to reduce the loss or error. This process is performed repeatedly over multiple epochs until the NER computing model converges, i.e., the loss or error is equal to or below a predetermined threshold, or until a predetermined number of epochs have occurred. Thereafter, the trained NER computing model may be applied to non-training data, that does not have known correct annotations, to thereby perform named entity recognition on the non-training data. In this way, the NER computing model is trained to recognize particular entities in the natural language content, or unstructured text.

As shown in FIG. 1, the NER computer model 110 may be any machine learning computer model that may be trained through a machine learning process, e.g., supervised machine learning, unsupervised machine learning, or any other hybrid or later developed machine learning process. In some illustrative embodiments, the NER computer model 110 comprises one or more machine learning computer models of one or more of a convolutional neural network (CNN), recurrent neural network (RNN), long short-term memory (LSTM), deep learning neural network (DNN), or other neural network computer model type. The NER computer model 110 processes input features 120 extracted from a natural language or unstructured text input 130, such as may be obtained from an electronic document, user textual input, or any other source of unstructured text/natural language content data. As shown in FIG. 1, the features 120 extracted from the input 130 may include word embeddings 122, character embeddings 124, pattern embeddings 126, and semantic category embeddings 128 for each token in the input 130, e.g., in this case each token corresponds to a word in the input 130, e.g., word1, word2, ... wordn, but may be any type of subset of textual content desirable for the particular implementation.

To extract the features 120 from the input 130, a variety of different engines 140-170 may be utilized to process the natural language content or unstructured text 130 and extract the corresponding features 122-128 for input to the NER computer model 110. The input 130 may be processed by a parser/tokenizer engine 125 that parses the natural language content/unstructured text (hereafter referred to simply as "natural language content") to generate tokens for further natural language processing (NLP) operations. In the depicted example, the tokens correspond to words in the natural language content input 130 as noted above. The tokens may then be passed to the various engines 140-170 for additional natural language processing operations. For example, the NLP embedding engine 140 may process the tokens, e.g., word1, word2, ..., wordn, from the input 130 to perform a word embedding and/or character embedding.

The parsing, tokenizing, and performance of word embedding and character embedding is generally known in the art and thus, a more detailed description is not provided herein. Suffice it to say that the word embedding generates a vector representation of the token which captures the grammatical function (syntax) and the meaning (semantics) of the word. However, it should be appreciated that the word embedding works for words that are known to the particular vocabulary for which the NLP embedding engine 140 operates. While the vocabulary may be quite large, there are still some words that are simply not in the vocabulary and thus, are considered out of the vocabulary. For these words, the character embedding is important for representing a word as a vector representation of the character-level compositions. The character embedding provides lexical information to enhance or enrich the word level embeddings when processed by the NER computer model 110.

By processing the syntax, semantics, and lexical aspects of the token, a corresponding output prediction of a label or annotation (also referred to as a tag) of the token may be generated by the NER computer model 110 based on the NER computer model's training to identify named entities in the input 130. However, as noted previously, this only works well if the NER computer model 110 has been trained to recognize the word embeddings and character embeddings of the particular words encountered in the input 130, i.e., for high-resource named entities. As the training will typically not include low-resource named entities due to the lack of representation in the training dataset(s), e.g., sensitive personally identifiable information named entities are typically not included in training dataset(s) at sufficient volumes of representation to allow the NER computer model 110 to be trained adequately to identify such entities, and the expense in generating additional resources for these low-resource named entities, e.g., human resources for curating and annotating such low-resource named entity samples. Thus, operating only on word and character embeddings is insufficient to recognize low-resource named entities.

To alleviate these issues, the illustrative embodiments provide additional engines 150-160 and logic in the NER computer model 110 to facilitate the machine learning training of an improved NER computer model 110 to perform entity recognition using not only word and character embeddings, but also higher level entity pattern and semantic context embeddings in accordance with one illustrative embodiment. The improved NER computer model 110 generates predictions of labels or annotations (or "tags") for tokens, specifying the named entity type classifications, based on a combination of the word embedding, character embedding, entity pattern embedding, and semantic category embedding, thereby generating probability values for each of one or more entity type classifications (or simply "entity types") and selecting an entity type classification having a highest probability as the resulting tag, label, or annotation (hereafter referred to as a "tag"). Once trained, the improved NER computer model 110 may then be applied to new natural language content with processing performed in a similar manner using these various embeddings to thereby predict the tag for new tokens in the new natural language content.

As shown in FIG. 1, in addition to performing the word embedding and character embedding by the NLP embedding engine 140, for a given token extracted by the tokenizer 125, the token(s) of the input 130 may also be input to the entity pattern embedding engine 150 and high resource NER computer model(s) 170. The entity pattern embedding engine 150 operates on the token in accordance with a predefined entity pattern recognition scheme of the entity pattern embedding engine 150, to thereby map the content of the token to an entity pattern of the content. For example, the entity pattern recognition scheme may map numerical values, or digits, to an entity pattern element of "D", and other characters to their corresponding entity pattern element types, such as non-letter characters, e.g., hyphens and other symbols, upper case letters "U", lower case letters "L", and the like, e.g., a social security number may be represented as "DDD-DDD-DDDD" meaning that the social security number consists of 3 digits "D" followed by a hyphen, followed by 3 digits "D", followed by a hyphen, and then 4 digits "D". This is only one example of an entity pattern that may be identified and represented in accordance with an entity pattern recognition scheme.

It should be appreciated that the entity pattern recognition scheme used to define and/or discover one or more full entity patterns that may be matched, e.g., the pattern DDD-DDD-DDDD may be mapped to a social security number, whereas the pattern UDDD-DDDD-DDDD, may be mapped to a particular license number, such as F225-9292-1234, where "U" represents an uppercase letter, "D" represents a digit, and "-" represents the hyphen symbol. A similar predefined entity pattern that represents the same license number pattern may be of the type U1D3-D4-D4 where the values indicate the number of instances of the preceding character type, e.g., in this example, the pattern is a single uppercase letter ("U1") followed by 3 digits ("D3"), a hyphen, 4 digits ("D4"), a hyphen, and then 4 more digits ("D4"), which is the same as the pattern UDDD-DDDD-DDDD. As another example, a US telephone number may be represented as the pattern DDD-DDD-DDDD or D3-D3-D4, or in other representations as (DDD)DDD-DDDD or (D3)D3-D4. Various entity pattern representation schemes and various entity patterns may be defined for various types of low-resource named entities.

While these entity patterns may be specified as predefined entity patterns in the entity pattern recognition scheme employed by the entity pattern embedding engine 150, it should be appreciated that it is not required that a human being manually annotate instances of these entity patterns in natural language content used for training the improved NER computer model 110. To the contrary, manual defining of entity patterns may be performed, or these entity patterns may be automatically detected based on processing a relatively small set of labeled (annotated) samples in which the entity pattern is determined, and the correct label or annotation is used to train the entity pattern embedding engine 150 to recognize the entity pattern as being mapped to a particular label, annotation, or tag. Thereafter, the entity patterns may be identified automatically in natural language content and the corresponding embedding provided as additional input to the improved NER computer model 110 for use in predicting the tag for a particular token, e.g., word.

The defined or automatically discovered entity patterns may be correlated with multiple different instances such that many different samples may map to the same entity pattern. These samples need not be specifically annotated as corresponding to the entity pattern, but may be automatically matched to the entity pattern by performing the entity pattern embedding of the instance. Moreover, the matching of the entity pattern in the instance, e.g., the token, to a defined or automatically discovered entity pattern, i.e., the learned entity pattern, allows for mapping the instance to a particular named entity type classification corresponding to the entity pattern, e.g., mapping an instance of 555-555-1234 and a separate instance of 554-554-4321 to an entity pattern of DDD-DDD-DDDD allows an identification of a named entity type classification of a TELEPHONE NUMBER.

It should be appreciated that the learned entity patterns may also be mapped to multiple different named entity type classifications, i.e., the same entity pattern may correspond to different named entity types for different domains, e.g., the entity pattern UDDD-DDDD may correspond to a MEMBER ID for a first organization, and an employee BADGE NUMBER for a different organization. Thus, additional semantic context may be needed to differentiate between the different named entity type classifications corresponding to a matched learned entity pattern. However, for purposes of the entity pattern embedding engine 150, the mapping of the pattern matching the token may be used to generate the entity pattern embedding, i.e., vector representation of the matching entity pattern, which may specify the one or more particular named entity type classifications to which the matching entity pattern is mapped, e.g., a vector may have vector slots for each of the possible named entity type classifications and values in each of the vector slots may be set based on a probability that the corresponding named entity type classification corresponds to the particular instance.

To provide additional input that may be used to differentiate between different instances of low-resource named entities that are mapped to the same entity pattern, classify an entity pattern not already known to the entity pattern embedding engine 150, or to learn a new entity pattern mapping for use in the entity pattern embedding engine 150, the semantic pattern embedding engine 160 takes information about the semantic context of the input 130 as input and embeds that information as a semantic category embedding 128 for the corresponding token. The semantic context may comprise the combination of high-resource named entity identified as present in the input 130, e.g., standard named entities or entities for which there is a relatively large number of examples in the training dataset to train the NER computer models to recognize instances of these named entities. These high-resource named entities may be identified by processing the input 130 through a trained high-resource NER computer model 170 and/or through matching with knowledge resources 175, such as knowledge graphs, gazetteers, or lexical knowledge bases, e.g., WordNet or the like.

The high-resource NER computer model 170 and/or knowledge resources 175 may be used to pre-label the high-resource named entities in the input 130. These pre-labeled named entities may be used to specify a semantic context pattern of high-resource named entities. Rules or mappings of the context pattern may be used to identify and embed other named entity types that are often present in conjunction with the context pattern, e.g., TELEPHONE NUMBER is often present in conjunction with the context pattern PERSON, ADDRESS. Thus, if there is an unknown token in the input 130, that has a pattern of DDD-DDD-DDDD, which based on entity pattern embedding appears to be a telephone number, and the input 130 also has the context pattern of PERSON, ADDRESS and thus, is likely associated with a TELEPHONE NUMBER, then the probability that the unknown token is a TELEPHONE NUMBER entity type is higher than if the entity pattern were different or the context pattern were different. Thus, the semantic pattern embedding engine 160 takes the high-resource named entities to identify a context pattern and embeds that context pattern as a vector, e.g., identifying which high-resource named entity types are present in the input 130.

Thus, the NLP embedding engine 140 processes the tokens of the input 130 from the tokenizer 125 to generate word embeddings 122 and character embeddings 124. The entity pattern embedding engine 150 processes the tokens of the input 130 to generate pattern embeddings 126 specifying the particular pattern of characters present in the tokens. The semantic pattern embedding engine 160 generates the semantic category embedding 128 that specifies the combination of high-resource named entities in the input 130 that specify the context of the token. These embeddings are generated for each token. Thus, for example, for the token "word1", word embedding 1 122, character embedding 1 124, entity pattern embedding 1 126, and semantic category embedding 1 128 are generated. Similarly, for a token "wordn", word embedding n, character embedding n, entity pattern embedding n, and semantic category embedding n are generated.

These features 120 for each token are input to the improved NER computer model 110, which then predicts a corresponding named entity type classification, or "tag" for the particular token. It can be appreciated that if the token corresponds to a high-resource named entity, the word embedding 122 and character embedding 124 will cause the NER computer model 110 to provide a high likelihood prediction of the corresponding named entity type classification. If the token is not a high-resource named entity, then the entity pattern embedding 126 and semantic category embedding 128 will provide the primary features for determining the most likely named resource entity type classification. However, for each token, all the embeddings are used together to generate the prediction of the named entity type classifications, i.e., the tag for the token, based on the training of the NER computer model 110.

It should be appreciated that during training of the NER computer model 110, all of the embeddings 122-128 are input to the NER computer model 110 as input features 120 for the samples in the training dataset. Thus, through the machine learning process, not only does the NER computer model 110 learn to associate particular word embeddings and character embeddings with instances of various named entity type classifications, but also learns associations of the corresponding entity patterns and semantic category embeddings with these named entity type classifications. The correspondence of entity patterns with the instances in the training dataset is automatically determined by recognizing the entity patterns corresponding to the entity pattern recognition scheme employed in an automated manner. Similarly, the semantic category embeddings may be automatically determined for the input 130 through analysis of the input 130 and pre-labeling of the high-resource named entities, without requiring manual labeling. Thus, these additional embeddings 126 and 128 may be determined automatically without any additional expenditure of human resources, such as through manual labeling of training data samples.

The predicted tags 115 generated by the improved NER computer model 110 may be output to a natural language processing (NLP) computing system 180. The NLP computing system 180 may utilize the named entity classifications, or tags, generated by the improved NER computer model 110 to perform additional NLP operations of various types. One such additional NLP operation is a semantic search engine. Users can enter "social security number" in a search engine to find all documents containing U.S. Social Security Numbers (i.e., tokens tagged as "SSN"). Further, the NER classifications can enhance data security and privacy in that a data protection system can use the entity type tags to locate the sensitive personally identifiable information (PIIs) and redact them from the input document before sharing the document with other parties or saving the document in a cloud storage or other cloud computing environment. It should be appreciated that these tags 115 will correctly identify the seldom encountered entities in the input 130, such as low-resource named entities present in the input 130, e.g., social security numbers, membership identifiers, badge numbers, account numbers, or sensitive personally identifiable information of various types that are not highly represented in training datasets.

Figure 2:
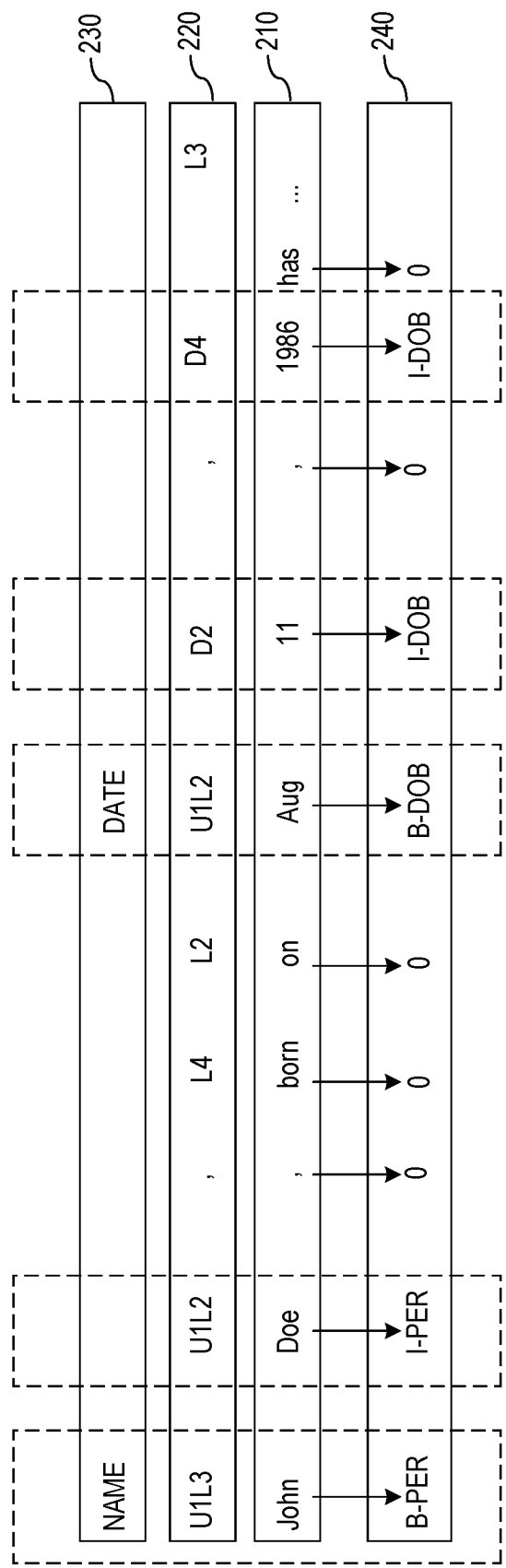
FIG. 2 is an example diagram of the results of the embeddings and corresponding tags generated by an improved NER computer model in accordance with one illustrative embodiment.

FIG. 2 is an example diagram of the results of the embeddings and corresponding tags generated by an improved NER computer model in accordance with one illustrative embodiment. The example shown in FIG. 2 is for an input natural language content comprising the sentence "John Doe, born on Aug. 11, 1986 has . . . " Each word in the sentence is a token extracted by the tokenizer from the natural language content, or unstructured text. Each token has a corresponding word embedding vector 210, character embedding vector(s) 220, and entity pattern embedding 230. For example, the entity pattern embedding for the token "John" is U1L3, and for the token "Aug" is U1L2 in the depicted example. Some of the tokens in the input may have an associated high-resource named entity type, the combination of which constitutes a context that provides a semantic category embedding 240, e.g., John is determined to be a "Name" entity type and Aug is determined to be a "Date" entity type. Based on these embeddings 210-240, the tokens have corresponding predicted tags 250 generated by the improved NER computer model of the illustrative embodiments.

In the depicted example, the first token "John" is tagged as a beginning ("B") token for a person ("PER") named entity type, or "B-PER". The token "Doe" is tagged as an intermediate ("I") token for a person ("PER") named entity type, or "I-PER". The tokens ",", "born", and "on" are not named entities and thus, are given tags of "O". The token "Aug" is tagged as a beginning ("B") of a date of birth (DOB), or "B-DOB", where the date of birth may be a low-resource named entity type. By evaluating the word embedding, character embedding, and specifically the entity pattern embedding along with the semantic category embedding representing the pattern of high resource named entity types (NAME, DATE), then improved NER computer model determines that the token "Aug" is likely representing the beginning of a date of birth (DOB). The same is true for the intermediate ("I") date of birth tokens "11" and "1986".

Thus, the illustrative embodiments provide mechanisms for learning the entity patterns of low-resource named entities and improving named entity recognition in computer executed natural language processing based on the learned entity patterns as well as the context or semantic category embedding determined based on the recognition of high-resource named entities present in natural language content corresponding to the low-resource named entities. The illustrative embodiments utilize word and character embeddings, but augment these embeddings with additional entity pattern embeddings and semantic category embeddings as input features to an improved named entity recognition computer model that operates on all of these embeddings to generate predictions of tags or named entity type classifications. These named entity type classifications are then provided to a natural language processing computing system that performs computer executed natural language processing based on the named entity type classifications. It should be appreciated that the accuracy of the named entity type classification tag predictions is increased, especially with regard to low-resource named entities, because of the ability to recognize the entity patterns and semantic categories corresponding to particular low-resource entity types.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, as noted above, the illustrative embodiments of the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool.

In particular, the improved computing tool of the illustrative embodiments specifically provides and improved named entity recognition (NER) computer model and improved NER computing logic operating with the NER computer model to perform NER operations based on entity embeddings and semantic category embeddings, which specifically improves named entity recognition in natural language content, or unstructured text, with regard to low-resource name entities. The improved computing tool implements mechanism and functionality, such as entity pattern embedding and context or semantic category embedding which are used as additional inputs to a modified NER computer model, such as may be implemented by a convolutional neural network (CNN), recurrent neural network (RNN), or other machine learning trained or deep learning neural network (DNN). Such mechanisms and functionality cannot be practically performed by human beings either outside of, or with the assistance of, a technical environment, such as a mental process or the like. The improved computing tool provides a practical application of the methodology at least in that the improved computing tool is able to perform named entity recognition (NER) with regard to low-resource named entities which in turn improves the accuracy of the NER operation performed by the NER computer model, and improves the accuracy of the natural language processing (NLP) computing system employing the NER computer model.

Figure 3:
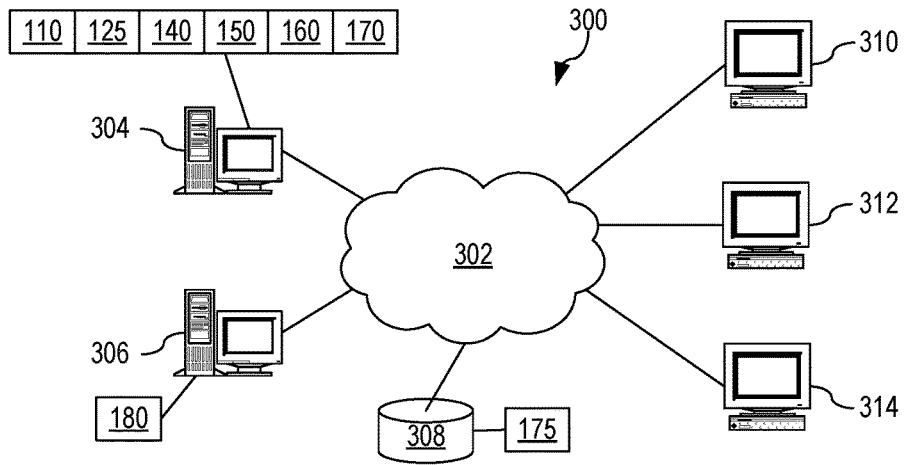
FIG. 3 is an example diagram of a distributed data processing system in which aspects of the illustrative embodiments may be implemented.
Figure 4:
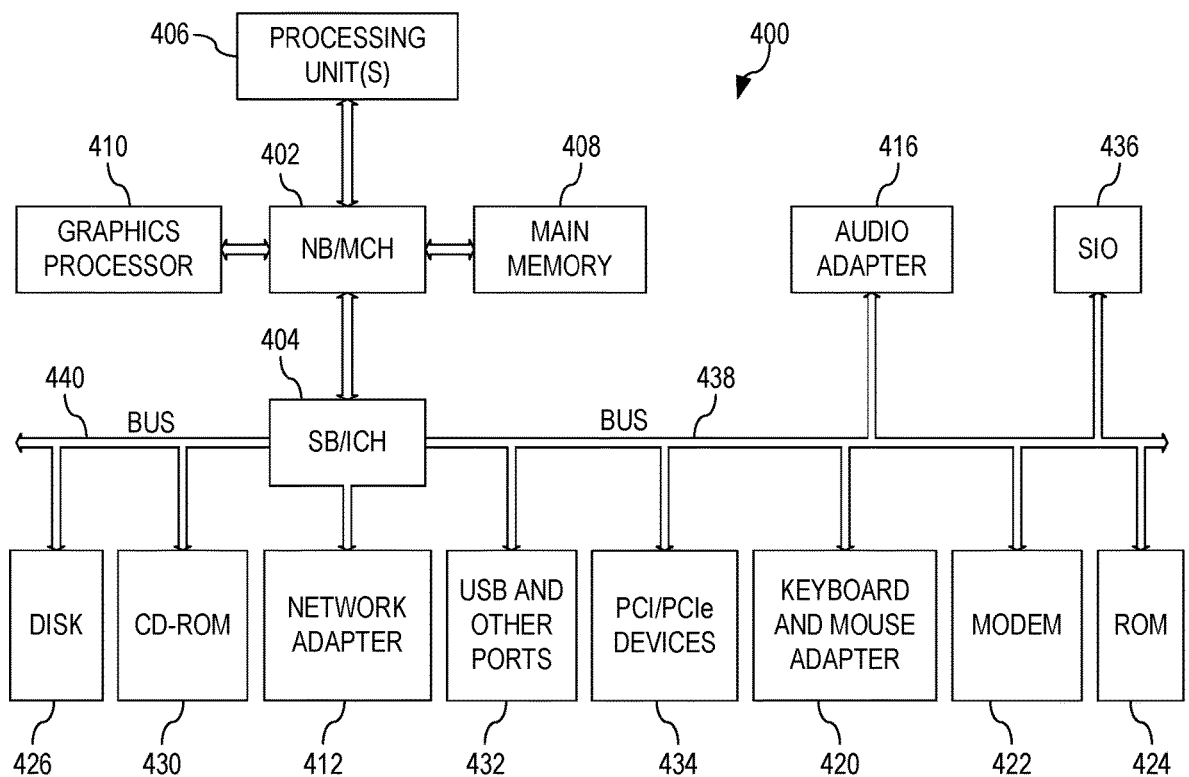
FIG. 4 is an example block diagram of a computing device in which aspects of the illustrative embodiments may be implemented.

From the above, it is clear that the illustrative embodiments are specifically directed to an improved computing tool, and specifically an improved named entity recognition computing tool and natural language processing computing system employing the improved named entity recognition computing tool. The improved named entity recognition computing tool and improved natural language processing system may be utilized in many different types of data processing environments. In order to provide a context for the description of the specific elements and functionality of the illustrative embodiments, FIGS. 3 and 4 are provided hereafter as example environments in which aspects of the illustrative embodiments may be implemented. It should be appreciated that FIGS. 3 and 4 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, one or more of the computing devices, e.g., server 304, may be specifically configured to implement an improved named entity recognition (NER) computer model and improved natural language processing computing system that operates based on the improved NER computer model. The server 304 may be specifically configured to implement the elements of FIG. 1 with regard to the tokenizer 125, the natural language processing (NLP) embedding engine 140, the entity pattern embedding engine 150, the high-resource named entity computer models 170, the semantic pattern embedding engine 160, and the improved NER computer model 110. The server 304 may also be configured to implement the natural language processing (NLP) computing system 180, or this NLP computing system 180 may be implemented on a different server, e.g., server 306. It should also be appreciated that the elements of FIG. 1 and the NLP computing system 180 may be distributed across a plurality of computing devices, such as a plurality of server computing devices, which may communicate, such as via one or more data networks, with each other to facilitate the performance of the various operations of the elements as described previously with regard to FIG. 1, without departing from the spirit and scope of the illustrative embodiments.

The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 304, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates low-resource named entity recognition in natural language content or unstructured text, which improves the natural language processing operations performed based on the named entity recognition.

As shown in FIG. 3, the server 304 may be invoked to process natural language content or unstructured text and thus, may execute the improved NER computer model 110 and its corresponding tokenizer 125 and engines and models 140-170 on the natural language content or unstructured text to generate tags, labels, or annotations that specify the named entity type classifications for tokens in the natural language content/unstructured text. The resulting named entity type classification tags, labels, or annotations may then be provided to an NLP system 180 to perform NLP operations based on these named entity type classification tags, labels, or annotations. These NLP operations are generally known in the art and may take many different forms depending on the desired implementation. The invoking of these mechanisms may be performed by applications running on a client computing device, e.g., client 310, a server computing device, e.g., server 306, or other computing device. The natural language content/unstructured text may be sourced from any suitable source computing system or data storage system, such as electronic documents from a corpus of electronic documents stored on one or more computing devices or in one or more network attached data storage systems, such as data storage unit 308. Thus, as one non-limiting example, a user of a client device 310 may initiate a NLP operation by sending a request to the server 304 requesting that an operation be performed with regard to one or more electronic documents stored in network attached data storage unit 308, where this operation may require the performance of natural language processing by the NLP computing system 180 which invokes the improved NER computer model 110 and its corresponding tokenizer 125 and engines/models 140-170 to perform the above described operations of one or more of the illustrative embodiments to perform improved NER operations and corresponding NLP operations on the named entity type classifications generated by the improved NER operations. In addition, these improved NER operations may make use of knowledge resources 175 which may be accessed from the same or different computing devices, e.g., servers 304 and/or 306.

As noted above, the mechanisms of the illustrative embodiments utilize specifically configured computing devices, or data processing systems, to perform the operations for low-resource named entity recognition and natural language processing based on the named entity recognition for low-resource named entities. These computing devices, or data processing systems, may comprise various hardware elements which are specifically configured, either through hardware configuration, software configuration, or a combination of hardware and software configuration, to implement one or more of the systems/subsystems described herein. FIG. 4 is a block diagram of just one example data processing system in which aspects of the illustrative embodiments may be implemented. Data processing system 400 is an example of a computer, such as server 304 in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System p® computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for executed by one or more hardware processors, such as processing unit 406, or the like. As such, the computing device shown in FIG. 4 becomes specifically configured to implement the mechanisms of the illustrative embodiments and specifically configured to perform the operations and generate the outputs described herein with regard to the improved NER computer model and its corresponding tokenizer and engines/models to perform entity pattern embedding and semantic category embedding.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
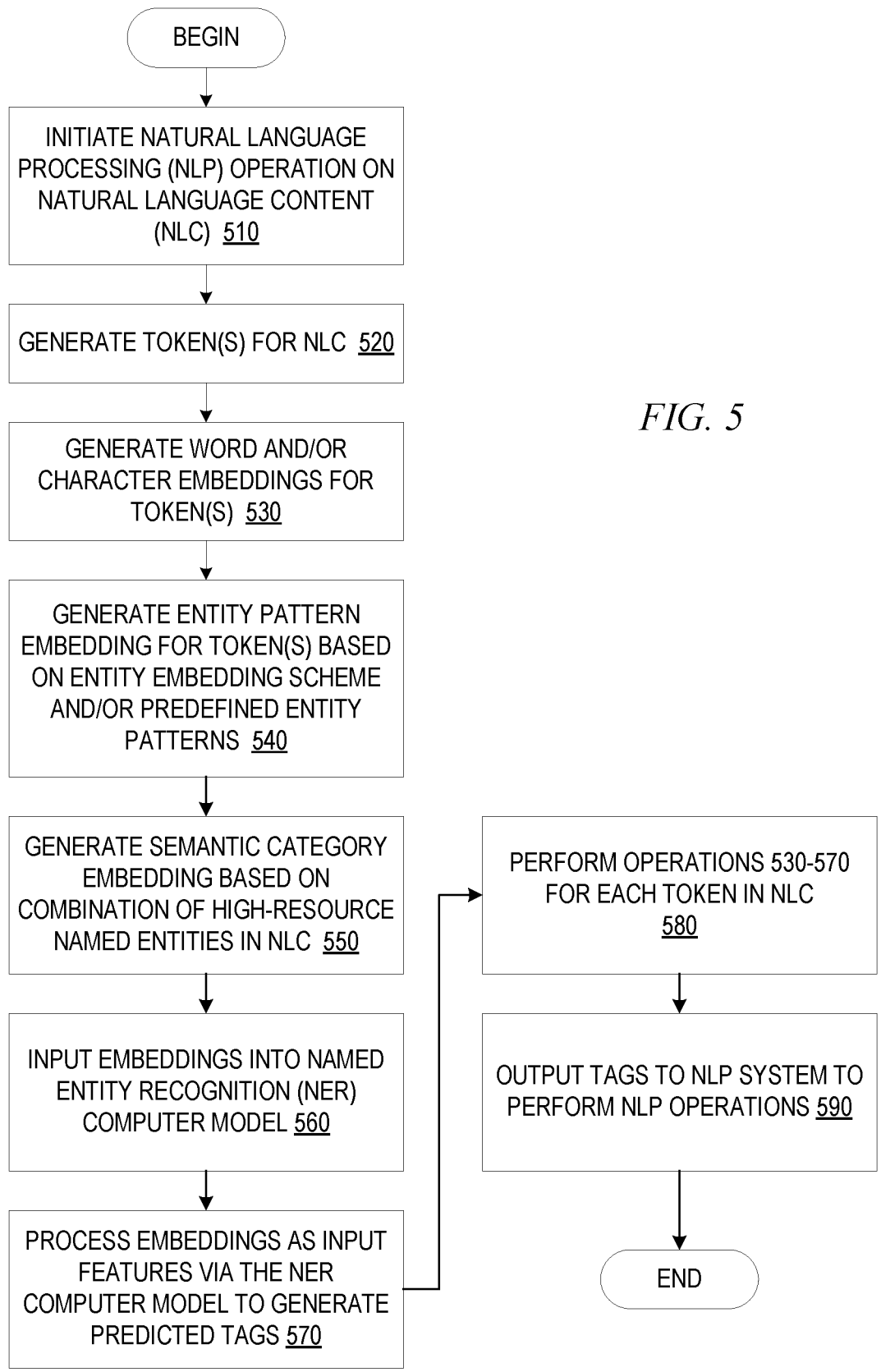
FIG. 5 is a flowchart outlining an example operation of an improved named entity recognition computing system using entity pattern and semantic category embeddings in accordance with one illustrative embodiment.

FIG. 5 is a flowchart outlining an example operation of an improved named entity recognition computing system using entity pattern and semantic category embeddings in accordance with one illustrative embodiment. The operation outlined in FIG. 5 assumes that the improved named entity recognition computer model of the illustrative embodiments has already been trained, based on a training dataset that has annotated or labeled samples specifying a correct named entity type classification, to process input features including entity pattern embeddings and semantic category embeddings, to generate predictions of tags specifying a named entity type classification.

As shown in FIG. 5, the operation starts by initiating a natural language processing (NLP) operation by an NLP computing system on a portion of natural language content, e.g., an electronic document, portion of unstructured text, or the like (step 510). The natural language content is processed by a tokenizer to break down the natural language content into tokens (step 520). The tokens are provided to an NLP embedding engine to generate word embeddings and/or character embeddings (step 530). The tokens are provided to an entity pattern embedding engine to generate entity pattern embeddings that specify the pattern of characters present in the token in accordance with an entity pattern embedding scheme/technique and/or in accordance with predefined entity patterns (step 540). The natural language content tokens (collectively) are provided to high-resource named entity model(s) to identify the high-resource named entities, if any, present in the natural language content and generate a semantic category embedding based on the combination of high-resource named entities present in the natural language content (step 550).

The embeddings generated in steps 530-550 are provided as input features for the token to a named entity recognition (NER) computer model (step 560). The NER computer model processes the embeddings and generates a prediction of a tag or annotation specifying a named entity type classification for the token (step 570). This operation is performed for each of the tokens in the natural language content (step 580). The resulting tags are output to an NLP computing system which then performs NLP operations based on the tags (step 590). The operation then terminates. It should be appreciated that while the operation is shown as terminating, this process may be repeated for each natural language content/unstructured text portion that is to be processed.

The operation of FIG. 5 outlined above is applied to all tokens, whether those tokens corresponding to high-resource named entities or low-resource named entities. Although not explicitly called out in the description of FIG. 5 above, because the improved NER computer model mechanisms of the illustrative embodiments enhance the NER computer model to operate on entity pattern embeddings and semantic category embeddings, the enhanced NER computer model is able to accurately identify low-resource named entities as well as high-resource named entities. This in turn improves the NLP operations performed by improving the accuracy of the NLP operations that operate based on named entity type classifications for low-resource named entities.

It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may initiate the performance of the operation set forth in FIG. 5 and may make use of the results generated as a consequence of the operations set forth in FIG. 5, the operations in FIG. 5 themselves are specifically performed by the improved computing tool in an automated manner.

As described above, the illustrative embodiments of the present invention are specifically directed to an improved computing tool that automatically learns entity pattern embeddings and context or semantic category embeddings associated with low resource name entities, such as sensitive personal information named entities, and uses the learned embeddings as additional input to a modified NER computer model to improve accuracy in identifying and classifying low resource named entities in natural language content, such as during a natural language processing operation performed by a natural language processing computing system. All of the functions of the illustrative embodiments as described herein are intended to be performed using automated processes without human intervention. While a human being may be the subject of the low resource named entities, e.g., the low resource named entities may be information that can personally identify an individual person, the illustrative embodiments of the present invention are not directed to actions performed by that person, but rather are directed to logic and functions performed specifically by the improved computing tool. Moreover, even though the present invention may provide an output to a natural language processing system that ultimately assists human beings, the illustrative embodiments of the present invention are not directed to actions performed by the human being, such as viewing the results of the natural language processing, but rather to the specific operations performed by the specific improved computing tool of the present invention which facilitate the processing by the natural language processing computer system in an improved manner. Thus, the illustrative embodiments are not organizing any human activity, but are in fact directed to the automated logic and functionality of an improved computing tool.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a natural language processing (NLP) computing system comprising a named entity recognition (NER) computer model augmented to operate on an entity pattern embedding input feature in addition to one or more other embedding input features, the method comprising:

tokenizing natural language content to generate one or more tokens, wherein each token represents a subset of text in the natural language content;

processing a selected token, in the one or more tokens, in accordance with a predetermined entity pattern embedding technique to generate an entity pattern embedding input feature for the selected token, wherein the entity pattern embedding input feature specifies a pattern of characters present in the selected token;

processing the natural language content to generate the one or more other embedding input features in accordance with one or more other embedding techniques;

processing, by the NER computer model, the one or more other embedding input features and the entity pattern embedding input feature for the selected token to generate a predicted tag for the selected token, wherein the predicted tag specifies a named entity type classification for the selected token; and performing, by the NLP computing system, an operation based on the predicted tag.

2. The method of claim 1, wherein the one or more other embedding input features comprise at least one of a word embedding input feature or a character embedding input feature.

3. The method of claim 1, wherein the one or more other embedding input features comprise a semantic category embedding input feature that specifies a context pattern of one or more high-resource named entity types present in the natural language content.

4. The method of claim 3, further comprising:
generating the semantic category embedding input feature at least by processing tokens in the natural language content via one or more high resource named entity computer models or matching the tokens to entries in one or more knowledge resources to generate named entity type classifications for one or more other tokens in the natural language content; and determining a semantic category embedding based on a combination of the named entity type classifications for the one or more other tokens in the natural language content.

5. The method of claim 4, wherein processing the one or more other embedding input features and the entity pattern embedding input feature for the selected token to generate the predicted tag for the selected token comprises:
processing, by the NER computer model, the combination of named entity type classifications based on learned association patterns specifying entity types that appear together in natural language content to generate a first prediction of a tag for the selected token;

processing, by the NER computer model, the entity pattern embedding input feature to map the entity pattern embedding input feature to one or more second predictions of the tag for the selected token; and combining, by the NER computer model, the first prediction and the one or more second predictions to generate the predicted tag.

6. The method of claim 1, wherein the operation is a machine learning operation that trains the NER computer model to recognize named entities in natural language content, and wherein the machine learning operation trains the NER computer model to recognize selected named entities by learning a correlation of the one or more other embedding input features and the entity pattern embedding input feature to a correct tag, wherein the correct tag specifies a correct named entity type classification for a selected named entity corresponding to the one or more other embedding input features and the entity pattern embedding input feature.

7. The method of claim 6, wherein the selected named entity is one of a sensitive personal information entity or a domain specific entity, for which there is less than a predetermined number of labeled instances in training data used to train the NER computer model.

8. The method of claim 7, wherein the sensitive personal information entity is at least one of a government identification entity, a membership identifier entity, a biomedical entity, or a cybersecurity entity.

9. The method of claim 1, wherein the entity pattern embedding technique comprises replacing letters with first entity pattern elements corresponding to a type of the letter and replacing numerical characters with second entity pattern elements specifying the numerical characters to be digits, and maintaining symbol characters as third entity pattern elements.

10. The method of claim 1, wherein the entity pattern embedding technique comprises replacing first alphanumeric characters of a first character type with a first entity pattern element specifying the first character type and followed by a first numerical value specifying a number of the first alphanumeric characters of the first character type, replacing second alphanumeric characters of a second character type, different from the first character type, with a second entity pattern element specifying the second character type followed by a second numerical value specifying a number of the second alphanumeric characters of the second character type, and maintaining symbol characters as third entity pattern elements.

11. A computer program product comprising a computer readable storage medium having a computer readable program stored therein, wherein the computer readable program, when executed on a data processing system, configures the data processing system to implement a natural language processing (NLP) computing system having a named entity recognition (NER) computer model, wherein the data processing system is further configured to:
tokenize natural language content to generate one or more tokens, wherein each token represents a subset of text in the natural language content;

process a selected token, in the one or more tokens, in accordance with a predetermined entity pattern embedding technique to generate an entity pattern embedding input feature for the selected token, wherein the entity pattern embedding input feature specifies a pattern of characters present in the selected token;

process the natural language content to generate the one or more other embedding input features in accordance with one or more other embedding techniques;

process, by the NER computer model, the one or more other embedding input features and the entity pattern embedding input feature for the selected token to generate a predicted tag for the selected token, wherein the predicted tag specifies a named entity type classification for the selected token; and perform, by the NLP computing system, an operation based on the predicted tag.

12. The computer program product of claim 11, wherein the one or more other embedding input features comprise at least one of a word embedding input feature or a character embedding input feature.

13. The computer program product of claim 11, wherein the one or more other embedding input features comprise a semantic category embedding input feature that specifies a context pattern of one or more high-resource named entity types present in the natural language content.

14. The computer program product of claim 13, wherein the computer readable program further causes the data processing system to:
generate the semantic category embedding input feature at least by processing tokens in the natural language content via one or more high resource named entity computer models or matching the tokens to entries in one or more knowledge resources to generate named entity type classifications for one or more other tokens in the natural language content; and determine a semantic category embedding based on a combination of the named entity type classifications for the one or more other tokens in the natural language content.

15. The computer program product of claim 14, wherein the computer readable program further causes the data processing system to process the one or more other embedding input features and the entity pattern embedding input feature for the selected token to generate the predicted tag for the selected token at least by:

processing, by the NER computer model, the combination of named entity type classifications based on learned association patterns specifying entity types that appear together in natural language content to generate a first prediction of a tag for the selected token; and processing, by the NER computer model, the entity pattern embedding input feature to map the entity pattern embedding input feature to one or more second predictions of the tag for the selected token; and combining, by the NER computer model, the first prediction and the one or more second predictions to generate the predicted tag.

16. The computer program product of claim 11, wherein the operation is a machine learning operation that trains the NER computer model to recognize named entities in natural language content, and wherein the machine learning operation trains the NER computer model to recognize selected named entities by learning a correlation of the one or more other embedding input features and the entity pattern embedding input feature to a correct tag, wherein the correct tag specifies a correct named entity type classification for a selected named entity corresponding to the one or more other embedding input features and the entity pattern embedding input feature.

17. The computer program product of claim 16, wherein the selected named entity is one of a sensitive personal information entity or a domain specific entity, for which there is less than a predetermined number of labeled instances in training data used to train the NER computer model.

18. The computer program product of claim 17, wherein the sensitive personal information entity is at least one of a government identification entity, a membership identifier entity, a biomedical entity, or a cybersecurity entity.

19. The computer program product of claim 11, wherein the entity pattern embedding technique comprises replacing letters with first entity pattern elements corresponding to a type of the letter and replacing numerical characters with second entity pattern elements specifying the numerical characters to be digits, and maintaining symbol characters as third entity pattern elements.

20. An apparatus comprising:
at least one processor; and
at least one memory coupled to the at least one processor, wherein the at least one memory comprises instructions which, when executed by the at least one processor, configures the a least one processor to implement a natural language processing (NLP) computing system having a named entity recognition (NER) computer model, wherein the at least one processor is further configured to:

tokenize natural language content to generate one or more tokens, wherein each token represents a subset of text in the natural language content;

process a selected token, in the one or more tokens, in accordance with a predetermined entity pattern embedding technique to generate an entity pattern embedding input feature for the selected token, wherein the entity pattern embedding input feature specifies a pattern of characters present in the selected token;

process the natural language content to generate the one or more other embedding input features in accordance with one or more other embedding techniques;

process, by the NER computer model, the one or more other embedding input features and the entity pattern embedding input feature for the selected token to generate a predicted tag for the selected token, wherein the predicted tag specifies a named entity type classification for the selected token; and perform, by the NLP computing system, an operation based on the predicted tag.

* * * * *